United States Patent [19]

Wright, deceased

[11] 4,428,394
[45] Jan. 31, 1984

[54] BAFFLE MECHANISM AND INSERT UNIT FOR DOWNSPOUT

[75] Inventor: Jack C. Wright, deceased, late of Bloomfield, N.J., by Charlotte M. Wright, executrix

[73] Assignee: Charlotte M. Wright, executrix, Bloomfield, N.J.

[21] Appl. No.: 268,857

[22] Filed: Jun. 1, 1981

[51] Int. Cl.³ .............................................. G05D 9/02
[52] U.S. Cl. .................................................. 137/122
[58] Field of Search ........................ 137/120, 121, 122

[56] References Cited

U.S. PATENT DOCUMENTS

| | | | |
|---|---|---|---|
| 264,393 | 9/1882 | Wilson | 137/122 |
| 397,416 | 2/1889 | Cawthorne | 137/122 |
| 406,877 | 7/1889 | Clark et al. | 137/122 |
| 649,838 | 5/1900 | Harry | 137/122 |
| 659,541 | 10/1900 | Martin | 137/122 |
| 726,063 | 4/1903 | Hummel | 137/122 |
| 914,936 | 3/1909 | Estes | 137/122 |
| 925,053 | 6/1909 | Sturgis | 137/122 |
| 1,006,138 | 10/1911 | Shelby | 137/120 |
| 1,127,500 | 2/1915 | Overmiller | 137/122 |
| 1,490,431 | 4/1924 | Pendergraft | 137/122 |
| 2,292,764 | 8/1942 | Levering | 137/122 |

FOREIGN PATENT DOCUMENTS 11357 of 1898 United Kingdom ................ 137/122

Primary Examiner—Robert G. Nilson
Attorney, Agent, or Firm—Howard E. Thompson, Jr.

[57] ABSTRACT

A downspout baffle mechanism is disclosed, adapted for use in conventional, vertically disposed downspouts for diverting controlled amounts of water descending in such downspouts to water collecting means located above and spaced from the normal downspout terminus. The baffle mechanism is controlled by the rise and fall of a suitable float in the water collecting means through a motion reversing mechanism such that the baffle diverts water through a side opening in the down position of the float and substantially seals such side opening in the up position of the float. The baffle and control mechanism is preferably incorporated in a preformed assemblage adapted for insertion in a conventional downspout by merely removing, at the desired elevation, an appropriate length of the downspout.

13 Claims, 7 Drawing Figures

U.S. Patent  Jan. 31, 1984  4,428,394
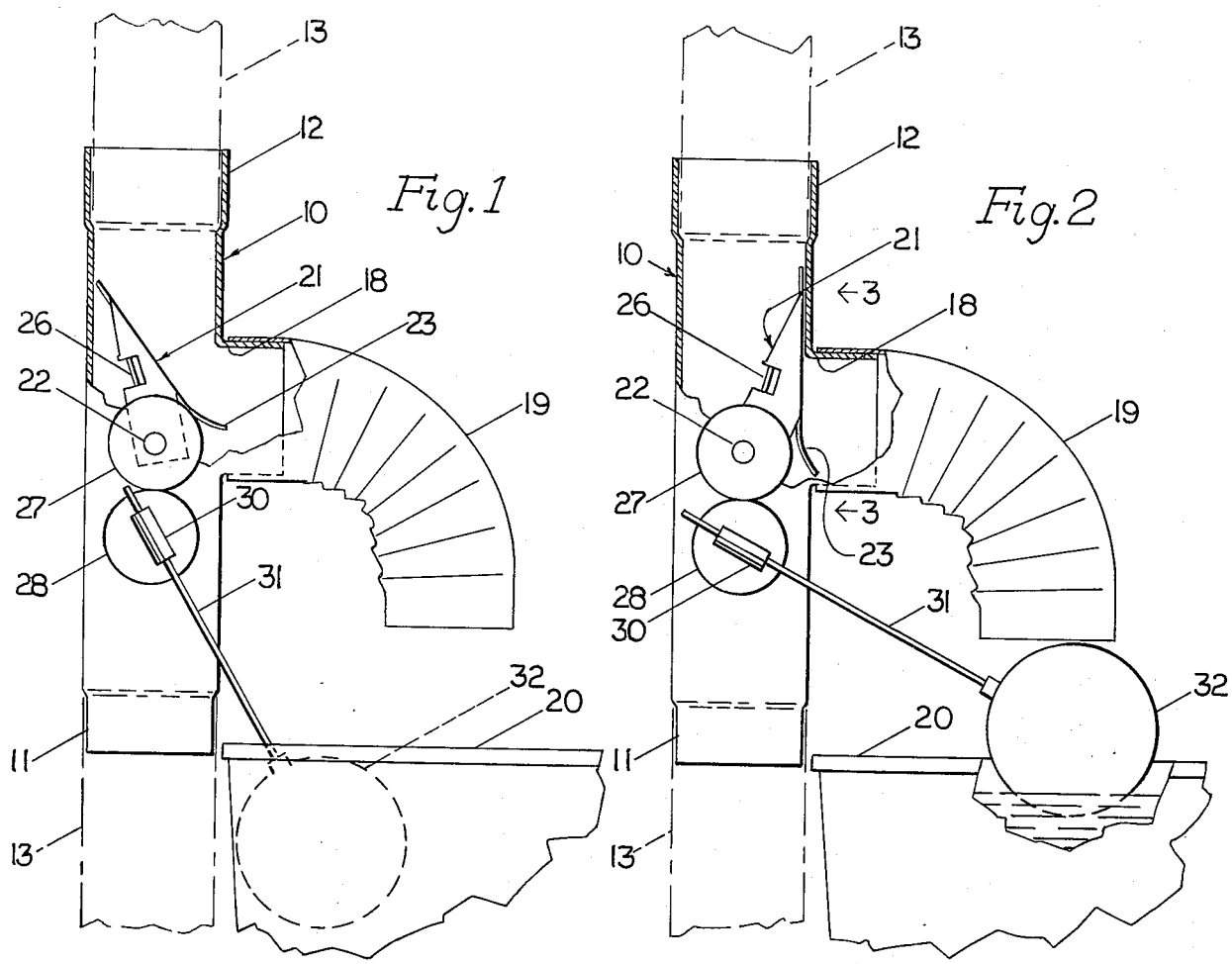
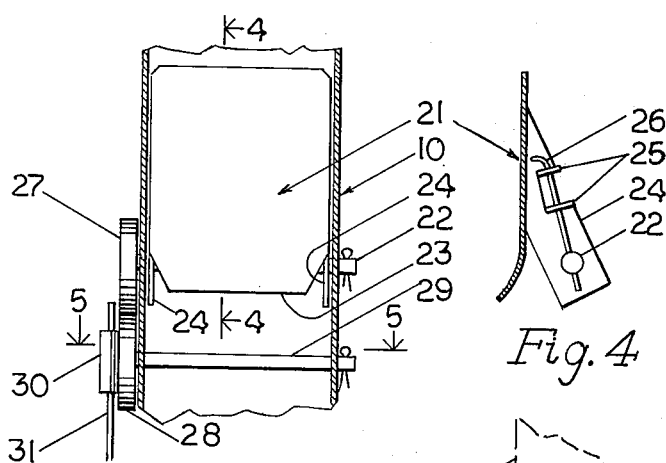
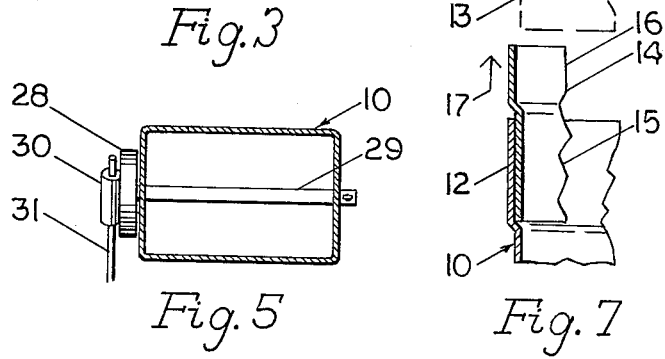

BAFFLE MECHANISM AND INSERT UNIT FOR DOWNSPOUT

This invention relates to a downspout baffle mechanism adapted for use in conventional, vertically disposed downspouts for diverting controlled amounts of water descending in such downspouts to water collecting means located above and spaced from the normal downspout terminus. The baffle mechanism is controlled by the rise and fall of a suitable float in the water collecting means through a motion reversing mechanism such that the baffle diverts water through a side opening in the down position of the float and substantially seals such side opening in the up position of the float. The baffle and control mechanism is preferably incorporated in a preformed assemblage adapted for insertion in a conventional downspout by merely removing, at the desired elevation, an appropriate length of the downspout.

For many years, particularly in areas serviced by municipal water supplies, it has been customary when applying gutters and downspouts to residential structures and the like to connect such downspouts to dry wells or natural drainage facilities with the primary purpose of preventing excess accumulation of rain water around the foundations of such structures. In accomplishing this, downspouts in conventional use are generally of a rectangular cross section contour and are mounted to structures in a way to be as inconspicuous as possible.

With the reduction of rainfall in much of the northeastern portion of the United States and the emergency which has developed in availability of municipal supplied water, there has been a growing need to minimize use of municipal water by collecting and storing rain water; and the device of the present invention has been developed to meet a recognized need for diverting rain water from conventional downspouts to appropriate water storage facilities.

Because nothing to satisfy this particular need appears to be currently available on the market, it is believed that the device, which is capable of easy, do-it-yourself installation, constitutes a contribution to the art which is worthy of patent protection.

In a preliminary patent search eight U.S. patents and one foreign patent issuing between 1882 and 1915 and two additional U.S. patents issuing respectively in 1924 and 1942 were found which are of a generally related nature in that they all contain float controlled valve means for diverting water flow in downspouts and the like. None of these patents, however, suggest the unique features of the present invention, namely the unique valve structure, the compact reversing mechanism imparting desired float control movement to the valve member, and the overall combination which enables the water diverting mechanism to be readily installed in a conventional downspout.

Considered in certain of its broader aspects the downspout baffle mechanism of the present invention is adapted for insertion in conventional downspouts of a generally rectangular cross section, comprises a baffle member mounted on a pivot axis which traverses, at the center line, the long dimension of said rectangular cross section, and is aligned with a side opening in the downspout. The baffle is a plate member having offset parallel flanges keyed to said pivot axis, the lower end of said plate member is curved away from the pivot axis to enter said side opening in all positions of movement of the baffle member, and edge portions of the plate member are contoured to closely engage inner downspout surfaces when angularly traversing the downspout, while permitting the plate member to substantially close the side opening when a baffle member is pivoted to provide juxtapositioned alignment of the plate member with the downspout all containing such opening. The pivot axis of the baffle has a radially extended integral member externally of the downspout operatively engaging a radially extended portion of a second external member mounted on a pivot axis below and parallel to the first pivot axis, said second external member having offset means engaging a vertically movable float, whereby upward movement of the float is translated to pivotal movement of the baffle from said downspout traversing position to that of juxtapositioned alignment with the downspout wall.

The baffle and control mechanism is preferably incorporated in a short length of conduit which may be a length of downspout, or a member fashioned by plastic molding or the like in a manner to interfit with downspout sections.

In a preferred embodiment of the invention adapted for easy, do-it-yourself installment by merely cutting out a section of downspout, a short length of conduit formed with a flanged side opening and having the baffle member and control mechanism pre-assembled therewith, is provided at the lower end with a structure adapted to telescopically enter the downspout from which a section has been removed, and is provided at the upper end with a structure adapted to telescopically receive the upper portion of the severed downspout. Because downspouts are frequently rigidly mounted to a structure, restricting movement of the parts after a section has been removed, it is preferable that the downspout engaging means at one end of the conduit section be carried by a telescopically movable portion of the conduit section.

The baffle mechanism and downspout insert of the present invention will be more fully understood from a consideration of the following description having reference to the accompanying drawing in which preferred adaptations of the invention have been illustrated with the various parts thereof identified by suitable reference characters in each of the views and in which:

FIG. 1 is a side elevation view of the baffle mechanism and downspout insert, partially broken away and in section, and illustrating the parts in the water diverting configuration.

FIG. 2 is a view similar to FIG. 1 showing the parts in non-diverting configuration.

FIG. 3 is a fragmentary view of the baffle and drive mechanism as viewed in the direction of the arrows 3,3 in FIG. 2.

FIG. 4 is a sectional view of the baffle member taken on the line 4,4 of FIG. 3.

FIG. 5 is a sectional view taken substantially on the line 5,5 of FIG. 3.

FIG. 6 is a fragmentary view similar to FIGS. 1 and 2 showing a modified form of drive mechanism and float engagement, and FIG. 7 is a fragmentary view of the upper portion of the downspout insert shown in FIGS. 1 and 2 indicating a modified form of construction.

As shown in FIGS. 1 to 5 a downspout insert 10 of generally rectangular cross section is provided with an externally reduced lower end 11 and an internally reduced upper end 12 to receive cut ends of a downspout 13 from which a section has been removed to receive the insert 10. If the insert 10 is of relatively thin walled structure as illustrated, the desired configuration in the upper end 12 can be accomplished by an enlarging offset of the insert walls in the area 12 as shown.

Coupling the insert 10 to the severed downspout 13 with the structure shown in FIGS. 1 and 2 requires some movement of the downspout ends. It is recognized, however, that downspouts are frequently mounted quite securely to structures; and to facilitate attachment of the insert 10 in such instances, it is desirable that the upper end of the insert 10 be of the modified structure shown in FIG. 7 in which a supplemental part 14 has a reduced portion 15 slidably entering end portion 12 of the insert and having an upper enlarged portion 16 adapted to engage the severed downspout end 13 as the supplemental part 14 is moved in the direction of the arrow 17.

The insert 10 has a flanged side opening 18 proportioned to receive a conventional downspout elbow 19 for guiding diverted water to a barrel or other water collecting facility 20.

A baffle 21 is pivotally mounted on an axis 22 in alignment with the side opening 18 and extending transversely of the longer cross section of the insert 10 at the center line of the insert and engaged downspout. As seen in FIGS. 1 & 2 the baffle 21 has an essentially planar surface with a lower end portion 23 curved away from the axis 22 and entering the side opening 18 in both the angled position of the baffle shown in FIG. 1 and the vertical position of the baffle shown in FIG. 2.

As more clearly shown in FIGS. 3 & 4 the baffle 21 has side flanges 24 which engage the axis 22; and one of the side flanges, the left flange as shown in FIG. 3, has a portion cut, drilled and offset to form bearing lugs 25, slidably receiving a pin member 26 which passes through a hole drilled in the pivot axis 22. The engagement of the pin 26 with the axis 22 and bearing lugs 25 acts to key the baffle 21 to pivot axis 22 so that movements of the axis 22 are translated to the baffle 21.

Externally of the insert 10 and keyed to the axis 22 is a radially extended member 27 which operatively engages a second radially extended member 28 mounted on a second pivot axis 29 parallel to and appropriately spaced from the pivot axis 22. The member 28 carries offset means 30 adjustably coupled with an elongated arm 31 having at its other end a float 32 adapted to enter the water collecting facility 20.

As shown in FIGS. 1 to 5 the engagement between the members 27 and 28, which can be viewed as rubber surfaced wheels, can be a simple frictional engagement; but it will be understood that any interengagement, which will impart reverse rotation of the members 27, 28 about their respective axis, can be employed. As shown in FIG. 6, for example, the members 27', 28' have been shown as intermeshed gears, but other motion translating means will be apparent to those skilled in the art. In this connection it will be noted that the total movement of the baffle 21 from the angled position of FIG. 1 to the vertical position of FIG. 2 is less than 45°; and it is apparent, therefore, that the interengaged portions of the members 27 and 28 need function only within this limited angle.

Keying of the baffle 21 to the pivot axis 22 can, of course, be handled in various ways. The particular structure shown is considered to have special advantage in ease of assembly since the pin 26 can be frictionally supported in the bushings 25 as the baffle is positioned in the downspout insert 10 and interengaged with the pivot axis 22. When the parts are properly positioned an elongated implement can then slide the pin 26 in the bushings 25 to engage with the aperture in the pivot axis 22.

With the structure as thus far described it will be apparent that when the water level in the collecting facility 20 is low and the float 32 is in the downward position shown in FIG. 1, the baffle 21 is supported in the water diverting position so that water moving downwardly in the downspout 13 will be guided through the side opening 18 and into the water collecting facility 20. As the water level approaches the top of the water collecting facility 20 it raises the float 32 to the position shown in FIG. 3 and in so doing moves the baffle 21 to the vertical position which substantially closes the side opening 18.

If the presence of a float 32 extending a substantial distance into a filled water collecting facility as shown in FIG. 2 is considered objectionable, an alternate approach has been shown in FIG. 6 where a float 32' is confined within a basket or other vertical guide means 33 having offset means 34 for suspending it from the upper edge of a barrel or other water collecting facility 20'. A rod 31' connected to the float 32' is pivotally engaged with the protruding end 35 of an extension arm 36 integral with the rotatable member 28'.

The structure as shown in FIG. 6 leaves a much greater portion of the barrel or other water collecting facility 20' exposed for easy access by those desiring to use the water. It will be understood, however, that a similar result can be achieved with any guide means which will confine vertical movement of the float to a position adjacent the side of the collecting facility 20'.

It will be apparent from the foregoing description that the downspout insert assemblage 10 can be very easily installed in existing downspouts by merely determining the approximate level of water desired in the collecting facility 20, 21' and then at the proper level in downspout 13 simply removing the appropriate length of downspout and replacing it with the insert assemblage. The insert assemblage is of simple and inexpensive construction and, because it can so easily be installed on a do-it-yourself basis, it is believed that the downspout insert assemblage could greatly facilitate the more effective collection and use of rain water.

Various changes and modifications in the baffle mechanism and downspout insert as herein described may occur to those skilled in the art; and to the extent that such changes and modifications are embraced by the appended claims, it is to be understood that they constitute part of the present invention.

I claim:

1. A downspout baffle mechanism for downspouts of a generally rectangular cross section, said mechanism comprising a baffle member mounted on a pivot axis which traverses, at the center line, the long dimension of said rectangular cross section and is aligned with a flanged side opening in the downspout, said baffle being a plate member having offset parallel flanges keyed to said pivot axis, the lower end of said plate member being curved away from the pivot axis to enter said side opening in all positions of movement of the baffle member, edge portions of the plate member being contoured to closely engage inner downspout surfaces when angularly traversing the downspout while permitting the plate member to substantially close the side opening when a baffle member is pivoted to provide juxtapositioned alignment of the plate member with the downspout wall containing such opening, said pivot axis having a radially extended integral member externally of the downspout rotatably engaging a radially extended portion of a second external member mounted on a pivot axis below and parallel to the first pivot axis, said second external member having offset means engaging a vertically movable float, whereby upward movement of the float is translated to pivotal movement of the baffle from said downspout traversing position to that of juxtapositioned alignment with the downspout wall.

2. A downspout baffle mechanism as defined in claim 1, wherein said baffle, flanged opening, and interengaged external members are part of a short conduit section assemblage having a cross section corresponding with conventional downspouts, and means at the ends of such conduit section facilitating interengagement with a downspout upon removal of a predetermined length of downspout.

3. A downspout baffle mechanism as defined in claim 2, wherein said interengaging means include a reduced dimension in the lower end of said conduit section facilitating entry of said section into the cut downspout, and an inner enlargement at the upper end of said conduit section facilitating entry of the cut downspout into said conduit section.

4. A downspout baffle mechanism as defined in claim 3, wherein said inner enlargement is formed in a telescopically movable portion of said conduit section, thereby facilitating the mounting of said conduit section to a rigidly mounted downspout after said predetermined length has been removed.

5. A device for controlling the diverting of water from a downspout to a water storage facility disposed forwardly of said downspout, said device comprising a baffle pivotally mounted within said downspout in alignment with a flanged opening in said downspout to be movable from an angular position which diverts water through said opening to an essentially vertical position which substantially closes said opening, float means adapted for vertical movement as the water level changes in said storage facility, a pair of rotatable members at one side of said downspout having parallel axes perpendicular to the center line of said downspout, said members being engaged so that clockwise movement of one member causes counterclockwise movement of the other member, the upper rotatable member being keyed to the pivot axis of said baffle, and the lower rotatable member having an offset engaging said float, whereby a predetermined movement of said float as water enters said storage facility causes said baffle to be moved from said angular position to said essentially vertical position.

6. A water diverting device for downspouts to controllably divert run off water to water storage facilities, said device comprising a baffle member pivotally mounted on an axis which is perpendicular to the center line of the downspout and parallel to a vertical surface against which the downspout is mounted, said axis being aligned with a flanged opening in said downspout adapted to engage conduit means communicating with a water storage facility, rotatable means keyed to the axis of said baffle and protruding outwardly of said downspout whereby the baffle can be moved from a first position wherein the baffle angularly traverses said downspout and enters said opening, to a second position which is substantially parallel to the center line of said downspout and overlying said opening, a second rotatable means below said first rotatable means and interengaging the same to impart reverse rotation thereto, an offset on said second rotatable means protruding forwardly of said downspout, and said offset means operatively engaging float means adapted to be disposed in a water storage facility, whereby the action of rising water in said storage facility activates said rotatable means to move the baffle from said first position to said second position.

7. A water diverting device as defined in claim 6, wherein said baffle member is of essentially planar contour with a slight outward curvature at its lower end and is provided with parallel rearwardly extending flanges keyed to a transverse axis member.

8. A water diverting device as defined in claim 7, wherein the baffle axis is approximately at the center line of said downspout and the dimension of said flanges is such as to dispose the planar portion of said baffle in juxtaposition to the inner front surface of said downspout when the baffle is in said second position.

9. A water diverting device as defined in claim 6, wherein the offset on said second rotatable means is an elongated arm having a float member fixedly secured thereto.

10. A water diverting device as defined in claim 6, wherein the offset on said second rotatable means pivotally engages an upwardly extending member on float means having guided vertical movement in said water storage facility.

11. A water diverting device as defined in claim 6, wherein said baffle, flanged opening, and rotatable means are part of a short conduit section assemblage having a cross section corresponding with conventional downspouts, and means at the ends of such conduit section facilitating interengagement with a downspout upon removal of a predetermined length of downspout.

12. A water diverting device as defined in claim 11, wherein said interengaging means include a reduced dimension in the lower end of said conduit section facilitating entry of said section into the cut downspout, and an inner enlargement at the upper end of said conduit section facilitating entry of the cut downspout into said conduit section.

13. A water diverting device as defined in claim 12, wherein said inner enlargement is formed in a telescopically movable portion of said conduit section, thereby facilitating the mounting of said conduit section to a rigidly mounted downspout after said predetermined length has been removed.

* * * * *